Oct. 22, 1963  D. J. CLARKE ET AL  3,107,627
ROTOR FOR RADIAL FLOW PUMPING MEANS
Filed June 27, 1958

INVENTOR.
Daniel J. Clarke
Edward A. Stalker

United States Patent Office 3,107,627
Patented Oct. 22, 1963

3,107,627
ROTOR FOR RADIAL FLOW PUMPING MEANS
Daniel J. Clarke and Edward A. Stalker, Bay City, Mich., assignors to The Stalker Corporation, Essexville, Mich., a corporation of Michigan
Filed June 27, 1958, Ser. No. 744,941
4 Claims. (Cl. 103—115)

Our invention relates to pumps of the centrifugal type.

An object of our invention is to provide a light weight rotor having smooth surfaces within particularly at the junction of blades and shrouds.

Another object is to provide a rotor which is light and strong.

Still another object is to provide a composite rotor whose major parts can be stamped or pressed from sheet metal.

Still another object is to provide a composite rotor whose parts are self jigging for a brazing operation.

It is also an object to provide a mass production method of making a rotor of sheet metal parts.

The above objects are accomplished by the means illustrated in the accompanying drawings in which—

Figures 1, 2:
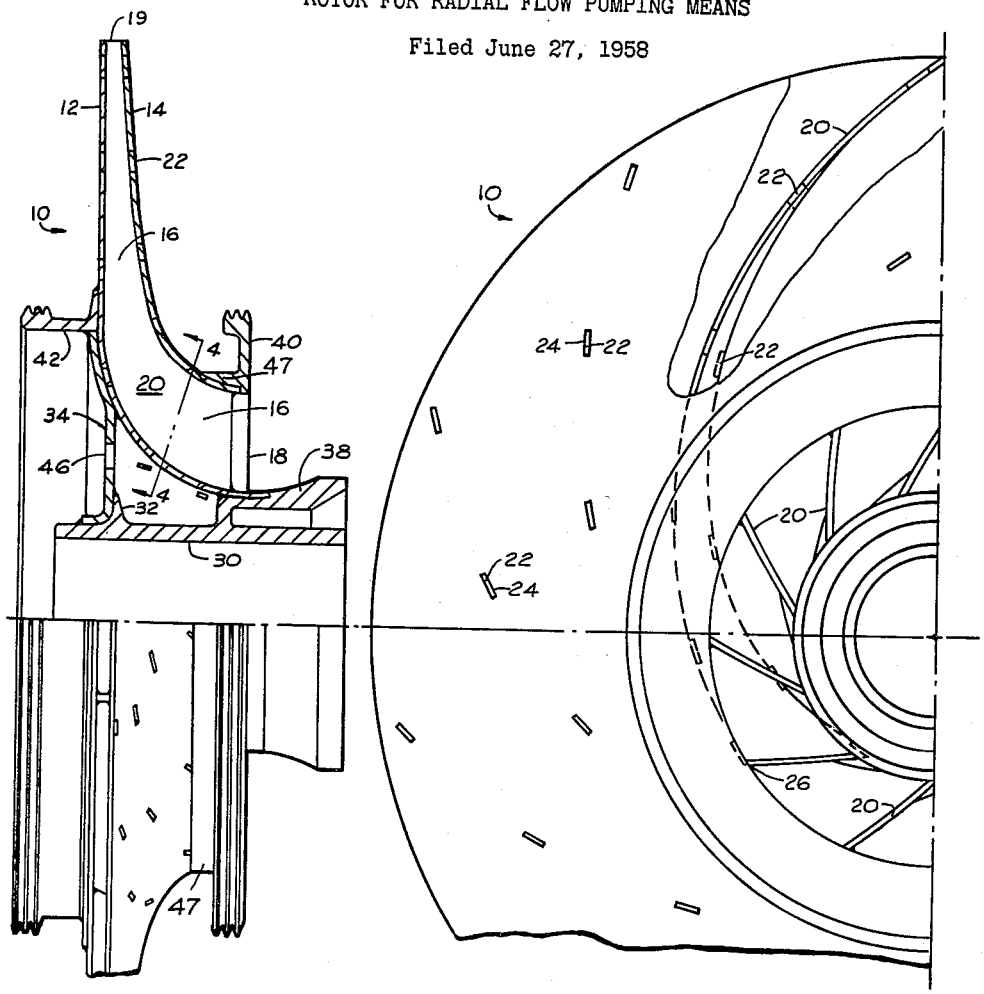
FIG. 1 is a front axial view of a rotor according to the subject invention, the rotor being partly in section.
FIG. 2 is a side view of the rotor of FIG. 1, partly in section.

It has been difficult to provide a light weight radial flow rotor which is both strong and cheap to make. For use in aircraft these characteristics are very desirable. The subject invention provides a light strong rotor which is cheap to produce.

Radial flow rotors are used for pumping fluids of various kinds in aircraft applications. These include compressing air for gas turbines, and pumping refrigeration gases and liquids.

For compressing air for gas turbines it is very important that the rotor be very strong as well as light since it must operate at very high rates of rotation, rates leading to blade tip speeds of supersonic magnitude. Yet the rotor should be economical to produce. These requirements are in part antagonistic to each other but are resolved in the subject invention.

In very small sizes as for pumping refrigeration gases it is very important that the flow passages between blades be very smooth so that the pumping or compressing is done at high efficiency. Pits or projections on the surface bathed by the gas would lead to grave losses in efficiency.

The subject invention provides a highly successful rotor by employing chiefly sheet metal parts which can be stamped or pressed by mass production methods. This ensures accurate parts of smooth contours and surfaces at low cost. The parts are joined together by high temperature solder insuring smooth fillets at the junction of blades and shrouds.

The process of joining by high temperature solder is also called brazing.

Referring now to the drawings the rotor is indicated generally as 10. It comprises the annular inner shroud 12 of flared or bell-like form and the outer shroud 14 of similar shape. The shrouds are spaced apart defining an annular flow duct 16 having an inlet 18 and exit 19. The inlet is adjacent the axis of rotation while the exit is at the rotor periphery preferably facing in the general radial direction to discharge fluid radially outward with centrifugal pressure.

Figure 3:
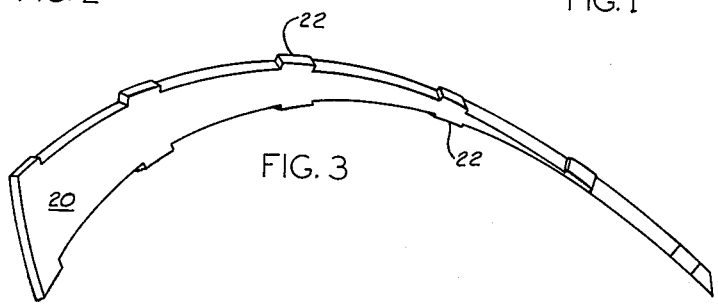
FIG. 3 is a perspective view of a blade isolated from the rotor.
Figure 4:
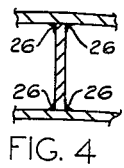
FIG. 4 is a fragmentary section on line 4—4 in FIG. 2.

The shrouds are positioned apart by the blades 20 whose length extends from the inlet to the exit. Each blade is preferably curved as is shown in FIGS. 1 and 3.

Each blade has a plurality of lugs 22 spaced along its length, each received in a hole 24. The blade including the lugs is bonded by fused metal, preferably by high temperature solder, to the shrouds. The solder also provides smooth fillets 26 throughout the length of each blade.

The assembly of shrouds and blades is supported on the element 30 serving as a hub for mounting the rotor for rotation about its rotation axis.

The hub element has the radial flange 32 to which the annular support disk 34 is bonded by fused metal, preferably solder. The disk fays the flange so that the joint is in shear. At the outer end the disk is bonded over an expanse of the inner shroud 12 of substantial radial width encircling the axis of rotation. This joint between the disk and the inner shroud is also in shear to provide a high strength soldered joint which will withstand the high centrifugal loads from rotation.

At the inlet end of the inner shroud it is bonded to the axially extending flange 38.

A ring 40 which may be a seal ring is bonded to the outer surface of the outer shroud 14 at its inlet end.

Another ring 42 such as a seal ring may be bonded to the inner shroud 12 at the portion thereof which is directed chiefly along the radial direction.

The rings 40 and 42 help carry the centrifugal loads of the blade and shroud assembly since they are complete rings about the axis of rotation.

The parts of the rotor are either sheet metal pressings or cheap machined parts such as can be done by simple turning on automatic lathes or screw machines. The precisely contoured parts of thin wall are made from sheet metal by dies so that these accurate forms of thin wall can be made cheaply.

The method of fabrication comprises the steps of pressing the shrouds 12 and 14 and blades 20 to shape in a first pressing, preferably stress relieving or annealing the parts at a temperature of the order of 1400° F. and then repressing to give the parts their final precise shape while avoiding the introduction of internal stress into the material.

Solder, as a paste, is preferably placed on the sides of the blades along their edges.

The disk 34 and ring 40 are tackwelded or otherwise fixed to the inner shroud at spaced points to hold them together during the soldering operation which is to join them to the inner shroud finally for a strong joint.

The blades are placed between the shrouds with the lugs in the shroud holes. Then the hub element 30 is provisionally fixed, preferably by tack-welds to the disk 34 fitting tightly against the flange 32 of the hub element. Solder preferably as a paste is placed adjacent the joint between the disk and the inner shroud. This may be done through the holes 46 in disk 34 which are spaced peripherally about the disk.

The inlet end of the inner shroud slides over the axial flange 38 when the hub element is slid axially rearward toward the disk. The ring 40 has an axially directed flange 47 faying the outer surface of the outer shroud to which it is tack-welded or otherwise fixed to position it during a soldering operation.

Solder, preferably in the form of paste is placed at all the joints.

The rotor assembly is preferably supported for soldering by the seal ring 42 bearing on a flat plate or other means. The assembly and plate are placed in the muffle of a furnace and heated in a controlled atmosphere in the muffle. For stainless steels, hydrogen is preferred. For titanium, a helium or argon atmosphere should be used.

By supporting the assembly with the ring 42 down, the molten solder will flow best into the joints of the disk and shroud and hub element.

It will now be clear that we have provided a novel and useful radial flow rotor and a method of making it. These solve the difficult problem of providing a light, strong and cheap rotor with smooth interior surfaces. Strength is achieved by providing joints in shear, and blade lugs which protrude through holes in the shrouds to which they are soldered. Inspection of the soldering of the lugs establishes the integrity or quality of the soldering of the blades to the shrouds.

The design and arrangement of the parts provide that the soldered joints are inspectable by penetrant and visual means and/or X-ray. This is very important for providing a safe rotor. A bursting rotor is very dangerous to personnel and particularly as a part of an aircraft.

It will now be clear that we have provided a novel radial rotor construction which is cheap to produce and very light weight. Furthermore very strong parts are used since these are made from strong rolled materials rather than castings and the like. Still further the material may be stainless of special alloy to resist corrosion and erosion from any impinging liquid particles. Thus the rotor has smooth surfaces internally for the efficient flow of the fluid handled and preserves these surfaces and their edges.

While we have illustrated a specific form of our invention it is to be understood that we do not intend to limit ourselves to this exact form but intend to claim our invention broadly as indicated by the appended claims.

We claim:

1. In combination in a radial flow compressor rotor of light and strong construction having smooth interior surfaces and adapted to mass production, a peripherally continuous annular inner sheet metal shroud having a flared shape, an annular outer sheet metal shroud peripherally continuous and shaped similarly to said inner shroud and spaced therefrom defining an annular duct having an annular axially facing inlet adjacent an axis of rotation and an exit facing radially outwardly of said axis to discharge fluid radially with centrifugal pressure, said shrouds being formed separately, a plurality of sheet metal blades positioned between said shrouds and peripherally spaced dividing said duct into a plurality of rotor passages, said outer shroud overlying the inlet ends of said blades, each of said blade being in contact at opposite edges with said shrouds and having a plurality of lugs spaced along the blade length and projecting through openings in each said shroud, solder bonding each said blade and the lugs thereof to each said shroud with a smooth fillet at the junctions of blade and shrouds substantially throughout the length of said blades, a sheet metal one-piece disk lapping said inner shroud over a substantial radial expanse thereof and bonded thereto by solder, a ring bonded to said outer shroud at said inlet to said duct, and an annular hub element positioned inwardly of said annular inner shroud for supporting said rotor for rotation having an axial length extending from a forward position adjacent said inlet rearwardly to a position radially inward of said exit, said hub element having an axially extending surface faying said inner shroud and bonded thereto by fused metal adjacent the inlet end thereof, said ring being radially opposite the portion of said hub element at said inlet, each said blade having its tip portion radially opposite said ring and secured thereto and its root portion radially opposite said portion of said hub element and secured thereto by brazing so that radial forces arising from centrifugal action are sustained directly radially by said ring and said hub element, the portions of each said blade adjacent said inlet extending radially outward from said inner shroud to said outer shroud along substantially straight lines throughout the radial extent thereof so that the centrifugal loads throughout said blades are sustained in tension, said hub element also having a radial flange integral therewith faying a side of said disk in spaced relation to said axial surface and being bonded thereto by fused metal.

2. In combination in a radial flow compressor rotor of light and strong construction having a smooth interior surface and adapted to mass production, a peripherally continuous sheet metal annular inner shroud having a flared shape, a peripherally continuous sheet metal annular outer shroud shaped similarly to said inner shroud and spaced therefrom defining an annular duct having an annular axially forwardly facing inlet adjacent an axis of rotation and an exit facing radially outwardly of said axis to discharge fluid radially with centrifugal pressure, a plurality of blades fabricated separately from said shrouds and positioned therebetween and peripherally spaced dividing said duct into a plurality of rotor passages, said inner and outer shrouds extending continuously over substantially the entire extent of said blades, each said blade being in contact at opposite edges with said shrouds, solder bonding each said blade to each said shroud with a smooth fillet at the junctions of blade and shrouds substantially throughout the length of said blades, a disk lapping said inner shroud over a substantial radial expanse thereof bonded thereto by solder, and a central axially extending hub element having an axial length extending from a forward position adjacent said inlet rearwardly to a position radially inward of said exit, said hub element bonded to said inner shroud peripherally thereabout adjacent said inlet and bonded to said disk in spaced relation to said inlet for mounting said rotor for rotation about said axis, said inner shroud fairing into the external surface of said hub element forwardly adjacent said axial facing inlet to guide streamline flow thereinto for efficient compressor action, each said blade having its root portion at the forward edge thereof secured by brazing to the portion of said hub element directly opposite radially of said root portion of each said blade to sustain centrifugal forces arising from compressor operation, and the portions of each said blade adjacent said inlet extending radially outward from said inner shroud to said outer shroud along substantially straight lines throughout the radial extent thereof so that the centrifugal loads throughout said blades are sustained in tension.

3. In combination in a radial flow compressor rotor of light and strong construction having smooth interior surface and adapted to mass production, a peripherally continuous sheet metal annular inner shroud having a flared shape, a peripherally continuous sheet metal annular outer shroud shaped similarly to said inner shroud and spaced therefrom defining an annular duct having an annular axially facing inlet adjacent an axis of rotation and an exit facing radially outwardly of said axis to discharge fluid radially with centrifugal pressure, a plurality of blades fabricated separately from said shrouds and positioned therebetween and peripherally spaced dividing said duct into a plurality of rotor passages, said inner and outer shrouds extending continuously over substantially the entire extent of said blades, each said blade being in contact at opposite edges with said shrouds, solder bonding each said blade to each said shroud with a smooth fillet at the junctions of blade and shrouds substantially throughout the length of said blades, a disk lapping said inner shroud over a substantial radial expanse thereof and bonded thereto by solder, and a central hub element bonded to said inner shroud peripherally thereabout adjacent said inlet and to said disk for mounting said rotor for rotation about said axis, and a ring fabricated separately from said outer shroud and positioned thereover and bonded to the outer surface of said outer shroud at said inlet to said duct, each said blade extending axially to said inlet having portions of said blades radially inward of said ring extending to a portion of said hub element inwardly radially opposite said ring to receive radial support therefrom.

4. In combination in a radial flow compressor rotor of light and strong construction having smooth interior surface and adapted to mass production, a peripherally continuous sheet metal annular inner shroud having a flared shape, a peripherally continuous sheet metal annular outer shroud shaped similarly to said inner shroud and spaced therefrom defining an annular duct having an annular axially forwardly facing inlet adjacent an axis of rotation and an exit facing radially outwardly of said axis to discharge fluid radially with centrifugal pressure, a plurality of blades fabricated separately from said shrouds and positioned therebetween and peripherally spaced dividing said duct into a plurality of rotor passages; said outer shroud extending forwardly to the inlet edges of said blades, each said blade being in contact at opposite edges with said shrouds, each said blade being bonded to each said shroud along the edges of said blades, and a central hub bonded to the forward end of said inner shroud peripherally thereabout adjacent said inlet, said hub having a disk fixed thereto and bonded to said inner shroud along a substantial radial expanse thereof, said disk being spaced rearwardly on said hub a substantial distance from said inlet providing longitudinal stability to said rotor, said blades over the axially forward portions thereof having projecting portions secured directly to the portion of said hub directly radially inward of said forward portions to transmit blade centrifugal loads along radial lines to said hub, the said inlet edges of each of said blades extending radially outwardly along substantially straight lines from said projecting portions to the forward edge of said outer shroud so that the centrifugal loads throughout said blades are sustained in tension by the immediately inward elements of each blade.

References Cited in the file of this patent

UNITED STATES PATENTS

| | | |
|---|---|---|
| 1,036,627 | Huguenin | Aug. 27, 1912 |
| 1,873,974 | Meyer | Aug. 30, 1932 |
| 1,877,347 | McMurdie | Sept. 13, 1932 |
| 1,953,064 | Dowson | Apr. 3, 1934 |
| 2,031,521 | Baumann et al. | Feb. 18, 1936 |
| 2,205,054 | Wemp | June 18, 1940 |
| 2,285,266 | Fulleman | June 2, 1942 |
| 2,344,444 | Malczewski | Mar. 14, 1944 |
| 2,360,440 | Muller et al. | Oct. 17, 1944 |
| 2,392,858 | McMahan | Jan. 15, 1946 |
| 2,540,991 | Price | Feb. 6, 1951 |
| 2,620,675 | Meadows et al. | Dec. 9, 1952 |
| 2,632,397 | Jandasek | Mar. 24, 1953 |
| 2,647,685 | Srogi | Aug. 4, 1953 |
| 2,752,859 | Zeidler | July 3, 1956 |
| 2,931,621 | O'Donnell | Apr. 5, 1960 |

FOREIGN PATENTS

| | | |
|---|---|---|
| 18,349 | Great Britain | of 1910 |
| 138,676 | Switzerland | May 16, 1930 |
| 350,763 | Great Britain | June 18, 1931 |
| 407,118 | Italy | Mar. 25, 1943 |
| 632,475 | Great Britain | Nov. 28, 1949 |
| 971,351 | France | July 12, 1950 |